United States Patent
Holloway, Jr.

[15] 3,696,803

[45] Oct. 10, 1972

[54] MOBILE KITCHEN

[72] Inventor: Alta Holloway, Jr., P.O. Box 488, Des Arc, Ark. 72040

[22] Filed: July 7, 1971

[21] Appl. No.: 160,470

[52] U.S. Cl. ............... 126/276, 126/25 R, 126/41 R
[51] Int. Cl. ........................... F24b 3/00, F24c 1/16
[58] Field of Search..126/276, 268, 25 R, 25 A, 41 R

[56] References Cited

UNITED STATES PATENTS

| | | | |
|---|---|---|---|
| 983,290 | 2/1911 | Kitchen | 126/276 |
| 1,285,304 | 11/1918 | Merrill | 126/276 |
| 2,666,425 | 1/1954 | Hastings, Jr. | 126/276 X |
| 2,666,426 | 1/1954 | Pollard | 126/276 X |
| 3,500,812 | 3/1970 | Korngold | 126/25 R |
| 3,513,822 | 5/1970 | Korngold | 126/25 R X |

*Primary Examiner*—Charles J. Myhre
*Attorney*—Rupert J. Brady et al.

[57] ABSTRACT

"Chuck Wagon" type apparatus including a pair of generally cylindrical barbecue type grills which may also be utilized as ovens is located on one side of a trailer. Deep fry apparatus is located on the other side and means located at the rear of the trailer is included for making and dispensing hot and cold beverages.

11 Claims, 7 Drawing Figures

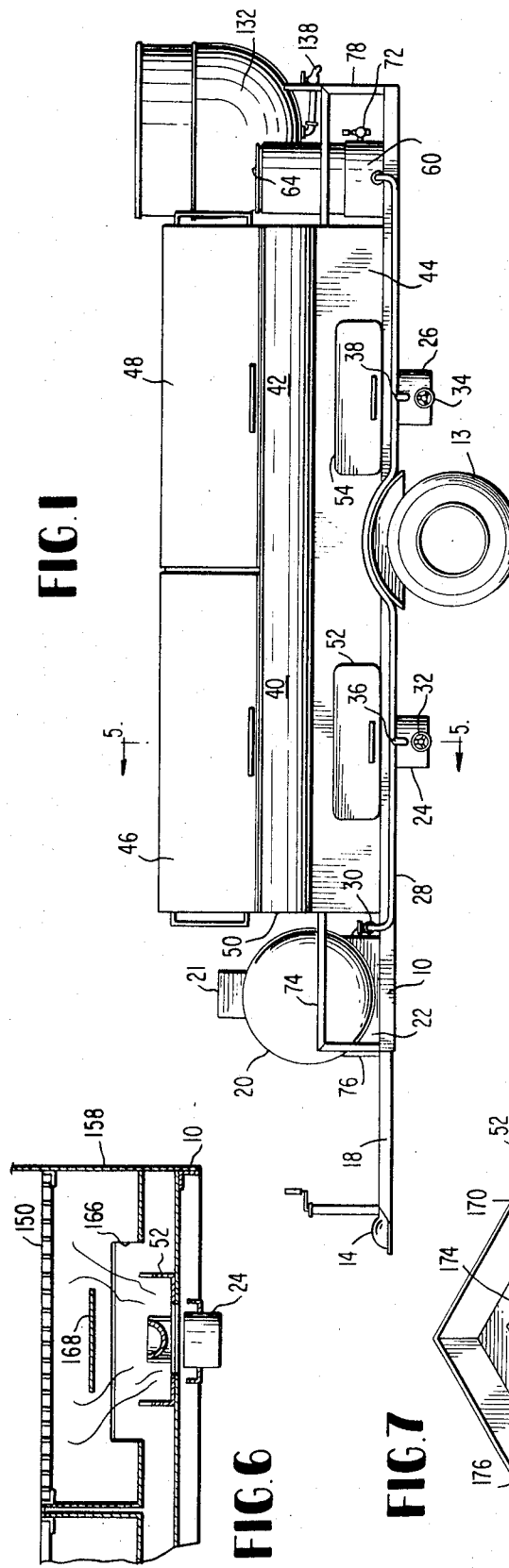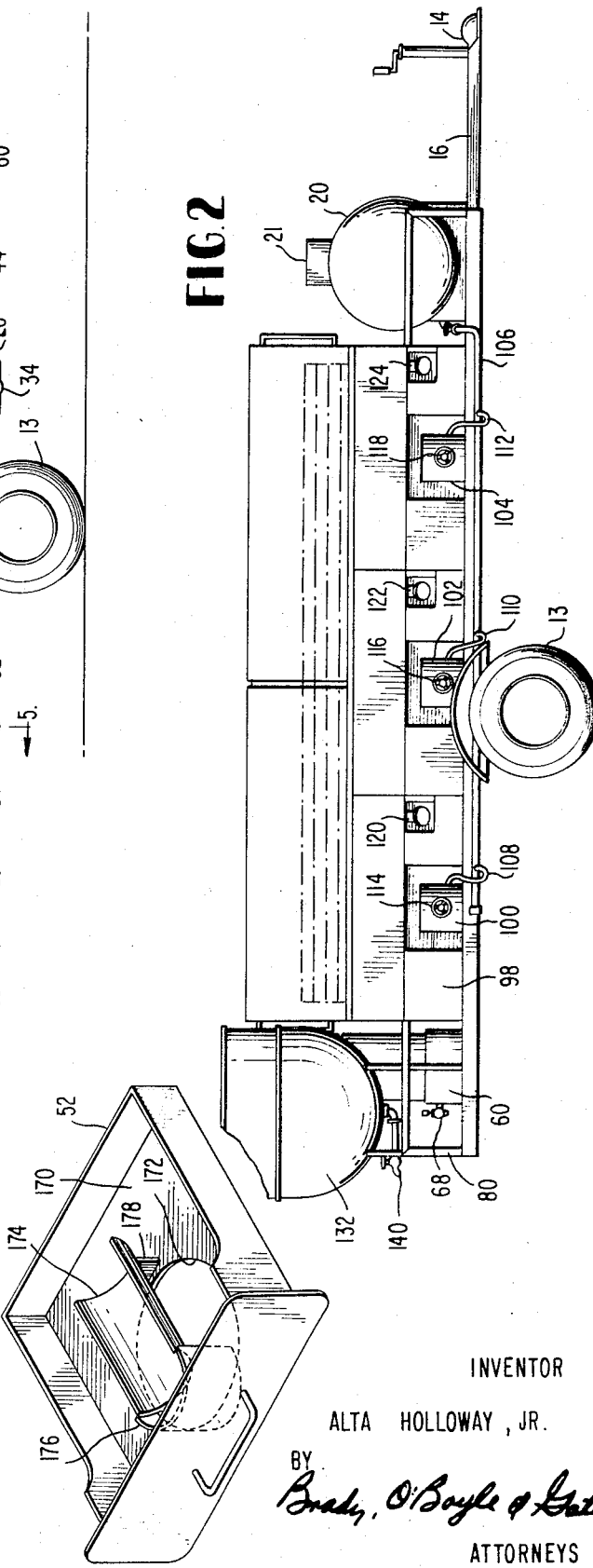
INVENTOR
ALTA HOLLOWAY, JR.
BY
Brady, O'Boyle & Gates
ATTORNEYS

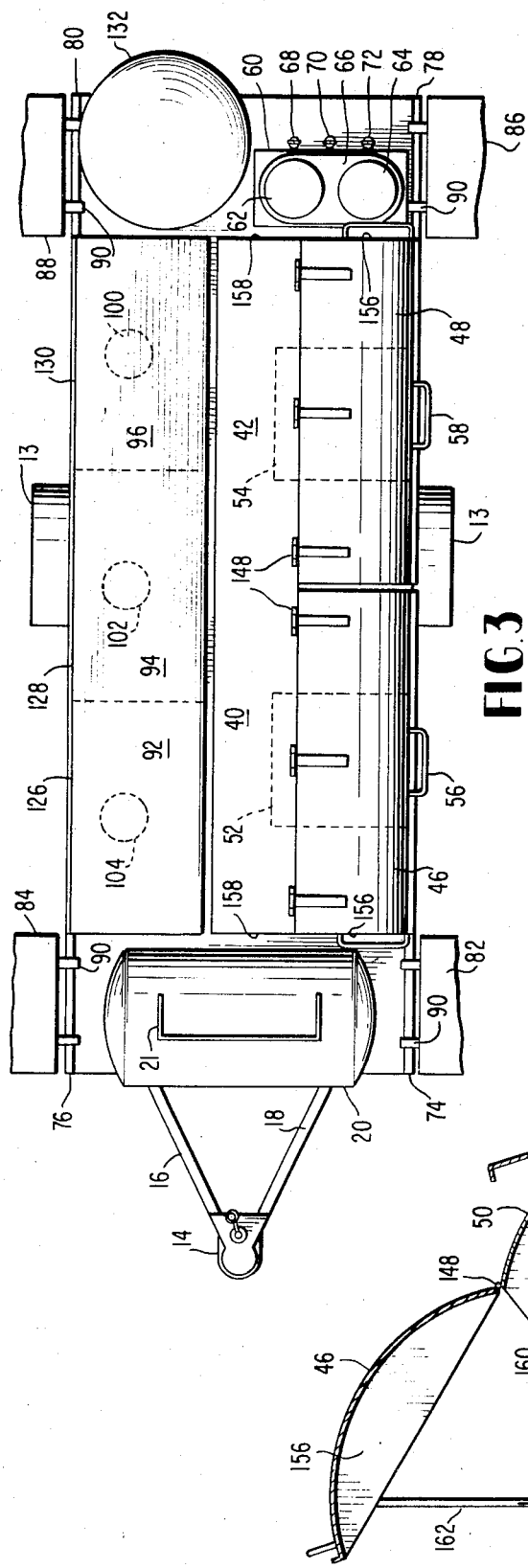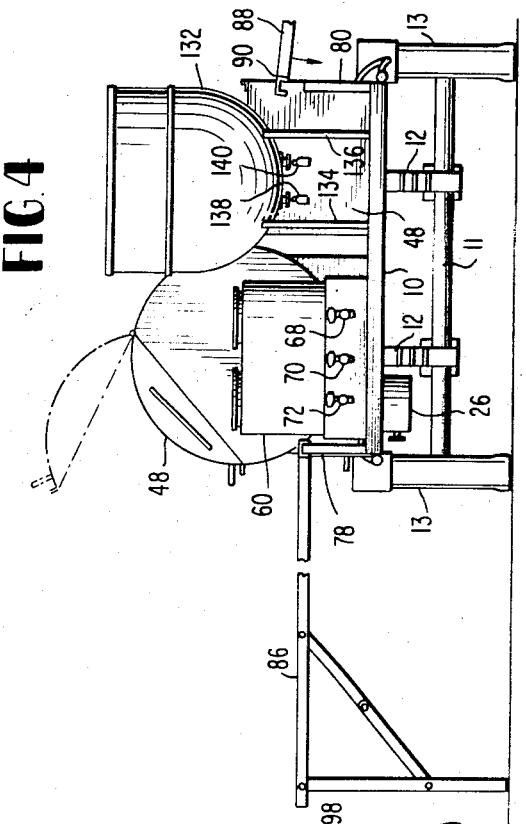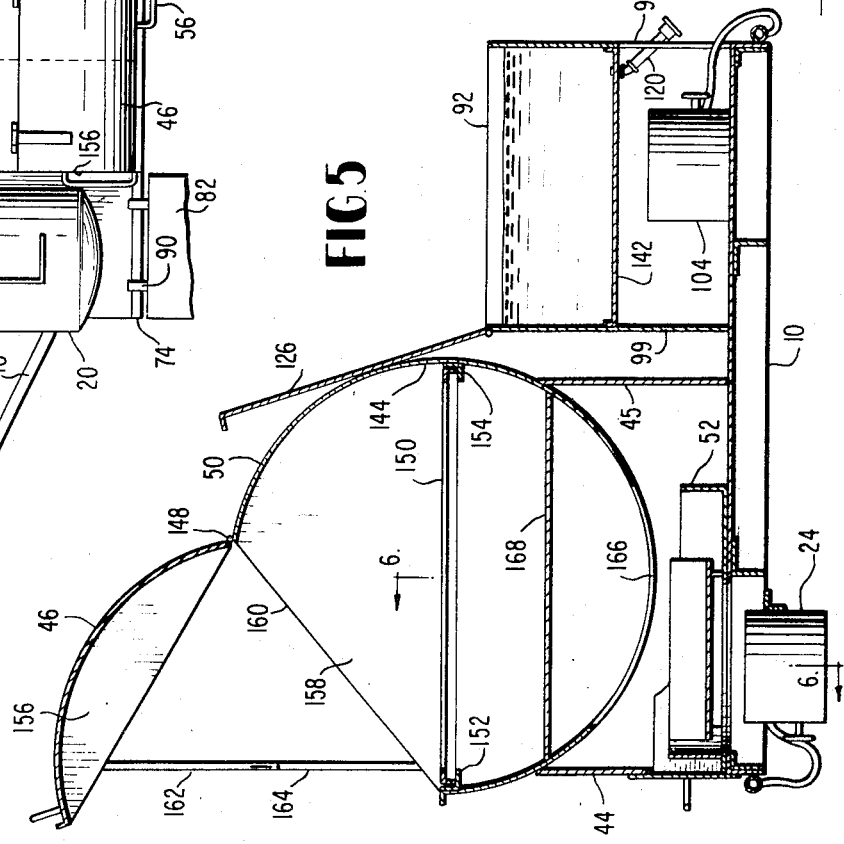

MOBILE KITCHEN

BACKGROUND OF THE INVENTION

1. Field of the Invention

This invention relates generally to apparatus for preparing and serving food and beverages and, more particularly, to a mobile kitchen mounted upon a trailer-type vehicle whereby preparation of food and beverages for service to a relatively large number of people can be provided at any convenient site.

2. Description of the Prior Art

Portable field kitchens and food tables are well known to those skilled in the art. In addition to portable and movable field kitchens utilized by the military, typical examples of other types of mobile cooking apparatus are: U.S. Pat. No. 2,043,797 issued to E. M. Horn which discloses a mobile type cooking and service table; U.S. Pat. No. 3,060,920 issued to A. E. Dibert which discloses a mobile barbecue apparatus detachably mounted upon a bus or other type vehicle; and U.S. Design Pat. No. 188,154 issued to William H. Frick which discloses a design of a cart-type mobile cooking and serving unit. Another type of mobile grill is disclosed in U.S. Design Pat. NO. 196,996 issued to Richard Kates which discloses an outdoor type grill for home use. Still other examples of mobile food service apparatus are disclosed in the following patents:

2,784,999—Hunt
2,413,164—Boldt
1,513,357—Webber
D–173,473—Clarke

All of the above-noted prior art, with the exception of the Dibert patent, disclose cart-type apparatus as opposed to cooking and serving apparatus mounted on a trailer where it can be hauled over relatively long distances and over many types of terrain.

SUMMARY

Briefly, the subject invention is comprised of broiling and deep frying apparatus preferably but not necessarily exclusively mounted on a trailer body having a frame which is generally rectangular in shape and which is mounted on at least one pair of wheels for transport. At the forward end of the frame, a trailer hitch is mounted thereon for coupling to a truck or other vehicle for being pulled from one location to another. Centrally located on one side of the frame is a pair of generally cylindrically shaped barbecue grills which are partially enclosed in and supported by a housing secured to the frame. A slidably removable fire box drawer is located in the housing beneath each of the grills and the grills, respectively, have openings in the bottom thereof in the vicinity of the drawers. Beneath each of the drawers is located gas burners which have access into the drawers. Oppositely disposed with respect to the pair of grills on the other side of the trailer body is a plurality of deep fry compartments aligned lengthwise along the frame and located in a second housing also attached to the frame. Each of the compartments also includes a separate burner. At the rear portion of the frame is mounted beverage preparation and dispensing apparatus. At either side of both ends of the frame is a bracket having a horizontal bar which is adapted to act as an attachment and support for a collapsible serving table which is carried on the trailer body during transport.

DESCRIPTION OF THE DRAWINGS

FIG. 1 is a side elevational view of one side of the preferred embodiment of the subject invention illustrating a pair of broiler grills included therein;

FIG. 2 is a side elevational view of the other side of the preferred embodiment of the subject invention illustrating the deep fry apparatus included;

FIG. 3 is a top elevational view of the preferred embodiment of the subject invention;

FIG. 4 is a rear elevational view of the subject invention being illustrative of the beverage preparation and dispensing apparatus, as well as the location of one or more portable serving tables ready for use;

FIG. 5 is a sectional view taken along line 5—5 of Figure FIG. and being illustrative of one grill and one deep fry compartment;

FIG. 6 is a sectional view taken along line 6—6 of FIG. 5 which is further illustrative of the arrangement of one broiler grill, fire box drawer and burner; and FIG. 7 is a perspective view of the fire box drawer utilized in combination with the apparatus shown in FIGS. 5 and 6.

DESCRIPTION OF THE PREFERRED EMBODIMENT

Referring now to the drawings wherein like numerals refer to like parts throughout, attention is directed first to FIGS. 1, 3 and 4 which are to be considered together. Reference numeral 10 designates a rigid, flat, generally rectangular metal vehicle frame which is secured to a carriage including an axle 11 and a spring suspension assembly 12 (FIG. 4). A pair of wheels 13 are mounted on the axle 11. The carriage including the wheels 13 are located substantially midway of the frame 10 for providing balance; however, when desirable, additional pairs of wheels may be included and rearranged to fit the specific needs of the user. Therefore, it should be pointed out at the outset of this specification that the present configuration is disclosed for purposes of explanation only and is not meant to be considered in a limiting sense.

On the forward portion of the frame 10 a trailer hitch 14 is attached to two metal bar members 16 and 18 which diverge away from the hitch 14 and attach to the forward crossbar member, not shown, of the frame 10. On the forward portion of the frame 10 just behind the trailer hitch 14 is mounted a gas tank 20 resting on mounting blocks 22 which are secured to the frame. The gas tank 20 is adapted to contain a relatively large volume of burner fuel, such as propane gas and includes fittings, not shown, which are adapted to be protected by the metal shield 21. The fuel gas is utilized for powering a plurality of gas burners, two of which are shown in FIG. 1 and having reference numerals 24 and 26. The burners 24 and 26 are fed from a gas line 28 coupled to the tank 20 through a manually operated cut-off valve 30. Each of the burners moreover includes manually adjustable burner controls 32 and 34, respectively, for controlling the amount of fuel fed from each of the burners from the line 28 by means of flexible line couplings 36 and 38.

Two cylindrical broiler type grills generally designated by reference numerals 40 and 42 are mounted in tandem on a housing secured to the frame 10. The housing includes a front wall 44 and a rear wall 45 and the front wall 44 is located along the edge of one side of the frame behind the tank 20. The grills 40 and 42 extend inwardly for substantially one-half of the frame's width. Each of the grills 40 and 42 includes hinged lids 46 and 48, respectively, which have a curvilinear surface adapted to close on a common curvilinear body wall 50 which rests on and is secured to the walls 44 and 45. The lids when closed and body wall define a substantially circular cross section. Below the body wall 50 of the two grills 40 and 42 is located a respective fire box drawer 52 and 54 which rest on the frame 10 above the burners 24 and 26. The drawers 52 and 54 additionally coact with the front housing wall 44 to provide a closed area when fully inserted therein, as shown. Each of the drawers 52 and 54 is provided with handles 56 and 58 to facilitate removal.

Just behind the rear grill apparatus 42 on the same side of the frame 10 is located a first beverage dispenser 60 which is adapted to include a burner, not shown, coupled to fuel line 28. The dispenser 60 is adapted to prepare either hot or cold beverages and includes three compartments 62, 64 and 66 which have independent spigot attachments 68, 70 and 72 coupled thereto for selective operation. FIGS. 1, 3 and 4 additionally disclose four upright bracket assemblies 74, 76, 78 and 80, each of which includes a horizontal bar member and which are secured to the frame 10 and the housing 44 fore and aft on either side to provide an attachment means and support for a serving table 82, 84, 86 and 88, respectively (FIG. 3). When desirable, just one of the tables may be utilized in any corner desired. The same may be said for two or three tables. Turning now briefly to FIG. 4, there is shown the serving table 86 coupled to the bracket 78 while table 88 on the other side of the trailer is being moved downwardly to couple to the bracket 80. Table 88 also discloses a pair of curved finger elements 90 which attach to the upper horizontal bar member. This configuration also pertains to the other tables 82, 84 and 86, as shown in FIG. 3.

Referring now to FIGS. 2, 3 and 4, in combination on the opposite side of the lengthwise portion of the frame 10 are located three deep fry compartments 92, 94 and 96 contiguously mounted in tandem in a second housing which includes a common front wall 98 and a common rear wall 99, both of which are secured to the frame 10. Beneath each of the compartments 92, 94 and 96 is located a respective gas burner 100, 102 and 104 which rest on the frame 10 inside of the housing behind the front wall 98. The burners 100, 102 and 104 are slidably mounted by means, not shown, so that they may be selectively removed from the housing when desirable. Each of the burners is supplied fuel from the propane gas tank 20 by means of the fuel line 106 and respective flexible line couplings 108, 110 and 112. Each of the burners also includes separate burner controls 114, 116 and 118. Additionally, each of the deep fry compartments has its own drain and valve assemblies 120, 122 and 124 which are adapted to feed off the liquid contents and residue of the compartments exteriorly from the front wall 98. The combination of the compartments 92, 94 and 96 with the housing 98 define a generally rectangular box-like configuration. Additionally, each compartment includes a generally flat lid 126, 128 and 130 which is hinged on the upper rear portion of the compartment. When the lids are closed, the flat outer surface thereof is adapted to provide a storage area for the tables 82 . . . 88 during transit, as shown in phantom view in FIG. 2.

Behind the rearmost deep fry compartment 96 is located a cauldron-type beverage dispenser 132 which is mounted on upright support members 134 and 136 as shown in FIG. 4. The dispenser 132 thus is located on the rear portion of the trailer frame 10 beside the other dispenser 60. The dispenser 132 additionally includes two spigots 138 and 140. When desirable, the contents of the dispenser 132 can be fed into the dispenser 60 by means of suitable hose and coupling means, not shown.

Directing attention now more particularly to the structural details of the broiler grill and deep fry apparatus thus described, reference is made now to FIG. 5 which is a cross section of the embodiment as shown in FIG. 1 and taken along the lines 5—5. FIG. 5 discloses a generally rectangular cross section of the deep fry compartment 92. The forward and rearward side portions thereof are part of the walls 98 and 99 and the hinged lid 126 is shown in a raised position. The bottom of the compartment 92 constitutes a relatively flat member 142 secured to the inner portion of the walls 98 and 99 substantially in the middle thereof. The deep fry compartment 92 thus constructed is adapted to contain any suitable deep frying material e.g., cooking oil, shortening, or deep frying fat, which can be heated to a liquified state and maintained at a predetermined temperature by means of the burner 104.

Regarding the grill portion, FIG. 5 illustrates a cross section of the grill 40. It discloses, among other things, that the cylindrical body wall 50 is supported by the vertical forward and rear housing walls 44 and 45. The hinged lid 46 is attached to the upper portion of the body wall 50 by means of a plurality of hinges 148 and its curvilinear surface also constitutes a circular cross section such that when the lid is in a lowered or closed position, the lid 46 and the body wall 50 define a closed cylindrical inner wall surface 144, the purpose of which is to provide an even distribution of heat throughout the interior of the grill. A metal cooking grid 150 is mounted substantially horizontally at the mid-point of the inner wall surface 144 by means of flanges 152 and 154. It should also be pointed out that the end walls 156 of the lid 46 constitute a circular section which meet the end walls 158 of the grill housing which also constitute a circular section completing a full circle when touching. The two meet along an inclined surface 160. The lid 46, when raised, is adapted to be held in an open position by means of a pair of hinged support members 162 and 164.

Considering now FIG. 5 together with FIG. 6, in the lower portion of the grill body 50 a cut-out 166 is included whereby heat generated either by the burner 24 or charcoal and the like burnt in the fire box drawer 52 can enter into the grill assembly below the metal cooking grid 150. The cut-out 166 is not coextensive with the length of the grill body wall 50 but is only of a predetermined length greater than the width of the fire box drawer 52, as shown in FIG. 6. The reason for this arrangement is to prevent any undue amount of heat from collecting between the housing walls 44 and 45 below the body wall 50. Additionally, a relatively flat preferably metal heat deflector member 168 having a width less than the width of the fire box drawer 52 is located in a substantially horizontal position across the cut-out 166 so that it is directly in the path of the heat rising from the fire box drawer 52. The heat deflector 168 is shown in FIGS. 5 and 6 to be located approximately midway between the grid 150 and the lowermost portion of the grill body wall 50. Not only does the heat deflector 168 serve to distribute the heat entering into the grill body but also prevents dripping grease or burning fat from any meat being cooked on the grid 150 from entering into the fire box drawer 52 to any great degree which would cause a flare-up which is a common hazard and inconvenience in cooking with this and all other types of charcoal grill apparatus.

Next, the configuration of the fire box drawer 52 should be considered for its unique configuration. The bottom surface 170 as shown in FIG. 7 contains a circular opening 172 which is adapted to be in registration with the burner 24 mounted under the frame 10 when the drawer is fully inserted into the housing wall 44 beneath the grill body 50 and its cut-out 166. A semi-cylindrical metal shelf 174 is positioned over the opening 172 and raised a predetermined amount therefrom by means of a second semi-cylindrical support member 176 and a rear support 178. The shelf 174 is positioned in a substantially horizontal attitude whereas the support 176 is substantially vertical. The purpose of the shelf 174 and its forward support 176 is to hold a piece of wood such as a hickory log, not shown, while the remainder of the drawer 52 may contain charcoal. It should be pointed out the fire box drawer 52 can be operated with either the wood alone or the charcoal alone, or both depending upon the use intended. It should also be pointed out that when desirable the drawer 52 can be either entirely removed or can remain empty when inserted for operating the burner 24 by itself for purposes of simply providing oven-type heat. When wood or charcoal or the like is placed in the drawer 52, the burner 24 is utilized only for igniting the contents and thereafter turned off. It can be seen, therefore, that the present embodiment provides great versatility in its use.

What has been shown and described, therefore, is a very versatile mobile kitchen which is adapted particularly for field use and the like where relatively large amounts of food and beverages can be prepared quickly and easily, such as at an outdoor barbecue and/or fish fry, and where the broiling of meats or the like is carried out on one side of the trailer and deep frying is carried out on the other side of the trailer. Portable tables are adapted to be attached to both sides of the trailer on either side thereof providing flexibility of service and both hot and cold beverages can be prepared and served from the rear of the trailer. While a mobile configuration is shown to be the preferred embodiment of the subject invention, it should also be pointed out that when desirable each of the components, particularly the grill assembly, can be utilized separately and in fixed or portable environments at the option of the user.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:
1. A cooking apparatus comprising in combination:
   a housing having at least front and rear wall portions, said front wall portion additionally having an opening therein for receiving a removable fire box drawer;
   a generally cylindrical broiler grill body mounted on said front and rear wall portions of said housing and including a pair of flat end walls, a curvilinear body wall portion attached to said pair of end walls, a curvilinear lid hingedly attached to said curvilinear body wall portion, said lid and body wall defining a substantially circular cross section when said lid is in a closed position, said body wall additionally having an aperture facing the interior of said housing by means of a cut-out in the lower portion of said curvilinear body wall portion, a broiler grid mounted in a substantially horizontal plane within said curvilinear body wall portion, and heat deflector means mounted in the curvilinear body wall portion intermediate said grid and said aperture and extending across the aperture to facilitate the distribution of heat entering into said broiler body by means of said aperture;
   a slidably removable fire box drawer adapted to contain combustible contents for providing cooking heat for said grill body, having a bottom portion including an opening therein, said drawer when inserted in said housing being located adjacent said aperture and substantially in registration with said heat deflector means; and
   a fuel burner located under said housing being substantially in registration with said opening in the bottom portion of said drawer when inserted in said housing, said burner being adapted to ignite said combustible contents of said drawer and/or to supply heat to said housing through said aperture.

2. The invention as defined by claim 1, wherein said heat deflector means comprises a relatively flat member disposed substantially horizontally across the interior of said body wall portion.

3. The invention as defined by claim 1, wherein said fire box drawer additionally includes a substantially semi-cylindrical shelf member mounted above said opening for holding a relatively large piece of combustible material.

4. The invention as defined by claim 3, wherein said opening includes dimensions at least equal to the cross sectional dimensions of said fuel burner.

5. The invention as defined by claim 1 and additionally including a wheeled frame including means for attaching said housing thereto whereby said cooking apparatus can be transported to any desirable site.

6. The invention as defined by claim 5, wherein said wheeled frame comprises a trailer-type vehicle.

7. The invention as defined by claim 6, wherein said trailer-type vehicle comprises a frame and wherein said front wall portion of said housing is disposed substantially along one side thereof.

8. The invention as defined by claim 7, and additionally including a second housing attached to said frame having respective front and rear wall portions and wherein said front wall portion thereof is disposed substantially along the opposite side of said frame, a relatively flat hinged lid attached to the rear wall portion and adapted to close on said front wall portion in a generally horizontal plane, and a bottom wall portion secured to said front and rear wall portions a predetermined distance above said frame, said wall portions thereby defining a deep frying cooking compartment.

9. The invention as defined by claim 8, and additionally including burner means positioned on said frame under the bottom wall portion of said deep frying cooking compartment for providing cooking heat to said compartment, and drain means connected to said compartment for selectively emptying the contents thereof.

10. The invention as defined by claim 9, and additionally including a fuel tank mounted on said frame and including fuel line and control valve means selectively coupling said fuel tank to said fuel burners.

11. The invention as defined by claim 7, and additionally including at least one table support bracket secured to said frame, said bracket having a relatively horizontal bar for table attachment, and a serving table having supporting legs located at one end thereof and means located at the other end thereof adapted to attach to said horizontal bar member, said table when attached to said bar providing a relatively flat table surface.

* * * * *